US012603517B2

(12) United States Patent
Guo

(10) Patent No.: US 12,603,517 B2
(45) Date of Patent: Apr. 14, 2026

(54) CHARGING CIRCUIT AND CHARGING CABLE

(71) Applicant: VIVO MOBILE COMMUNICATION CO., LTD., Guangdong (CN)

(72) Inventor: Pengfei Guo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 667 days.

(21) Appl. No.: 18/090,224

(22) Filed: Dec. 28, 2022

(65) Prior Publication Data

US 2023/0134179 A1 May 4, 2023

Related U.S. Application Data

(63) Continuation of application No. PCT/CN2021/102359, filed on Jun. 25, 2021.

(30) Foreign Application Priority Data

Jun. 29, 2020 (CN) .......................... 202010603516.0

(51) Int. Cl.
*H02J 7/00* (2026.01)
(52) U.S. Cl.
CPC .... *H02J 7/007182* (2020.01); *H02J 7/00034* (2020.01); *H02J 7/0071* (2020.01)
(58) Field of Classification Search
CPC . H02J 7/007182; H02J 7/00034; H02J 7/0071
USPC ....................................................... 320/162
See application file for complete search history.

(56) References Cited

U.S. PATENT DOCUMENTS

| | | | | |
|---|---|---|---|---|
| 10,424,950 | B2 * | 9/2019 | Chen | H10D 89/611 |
| 2018/0145469 | A1 * | 5/2018 | Chung | H01R 31/065 |
| 2021/0188451 | A1 * | 6/2021 | Wang | H02J 7/0063 |
| 2022/0385093 | A1 * | 12/2022 | Chang | H02J 7/00711 |

FOREIGN PATENT DOCUMENTS

| | | | |
|---|---|---|---|
| CN | 106300314 A | | 1/2017 |
| CN | 107706685 A | | 2/2018 |
| CN | 108075325 A | | 5/2018 |
| CN | 108233130 | * | 6/2018 |
| CN | 108233130 A | | 6/2018 |

(Continued)

OTHER PUBLICATIONS

First Office Action for Chinese Application No. 202010603516.0, dated Jul. 30, 2021, 7 Pages.

(Continued)

*Primary Examiner* — Nathaniel R Pelton
(74) *Attorney, Agent, or Firm* — BROOKS KUSHMAN P.C.

(57) ABSTRACT

A charging circuit and a charging cable. The charging circuit includes a first interface, a second interface, a detection control module, and a switch module. The first interface outputs a high-level signal through a first signal pin in a case of detecting that the first interface is plugged with a charger compatible with a fast charging protocol; and the detection control module controls the switch module to perform a preset operation in a case of detecting the high-level signal, so that the first signal pin and a second signal pin are connected, and ground and a bus are disconnected.

18 Claims, 3 Drawing Sheets

(56)     References Cited

FOREIGN PATENT DOCUMENTS

| | | | |
|---|---|---|---|
| CN | 109478176 | A | 3/2019 |
| CN | 210129644 | U | 3/2020 |
| CN | 111697663 | A | 9/2020 |
| JP | 4041840 | B1 | 2/2008 |

OTHER PUBLICATIONS

International Search Report and Written Opinion for Application
No. PCT/CN2021/102359, dated Sep. 29, 2021, 9 Pages.

* cited by examiner

CHARGING CIRCUIT AND CHARGING CABLE

CROSS-REFERENCE TO RELATED APPLICATIONS

This application is a continuation of PCT International Application No. PCT/CN2021/102359 filed on Jun. 25, 2021, which claims priority to Chinese Patent Application No. 202010603516.0, filed on Jun. 29, 2020, which are incorporated herein by reference in their entireties.

TECHNICAL FIELD

This application relates to the charging field, and specifically, to a charging circuit and a charging cable.

BACKGROUND

Currently, as functions of electronic devices become more powerful, a standby time of an electronic device becomes shorter. In a case that a user pays more attention to a standby duration, a solution of using a fast charging protocol for fast charging (that is, increasing charging power) emerges.

Currently, the fast charging protocol of the electronic device is generally a PD (Power Delivery) protocol. The fast charging protocol is a standard protocol formulated by the USB IF and needs to communicate through a CC signal line in a charging cable. Currently, many notebook computers, Pads, electronic devices, and other products on the market gradually support this protocol. However, an interface of current chargers is a type-A interface (without a CC signal line), which cannot be compatible with a fast charging function in a case of realizing ordinary charging.

SUMMARY

Embodiments of this application provide a charging circuit and a charging cable, which can resolve the problem that a fast charging function is incompatible in a case that ordinary charging is realized.

This application is implemented as follows:

According to a first aspect, an embodiment of this application provides a charging circuit, including a first interface, a second interface, a detection control module, and a switch module, where the first interface includes a first signal pin, the second interface includes a second signal pin, the detection control module and the switch module are sequentially connected in series between the first signal pin and the second signal pin, and the switch module is further connected in series between ground and a bus that is connected between the first interface and the second interface; the first interface is configured to output a high-level signal through the first signal pin in a case of detecting that the first interface is plugged with a charger compatible with a fast charging protocol; and the detection control module is configured to control the switch module to perform a preset operation in a case of detecting the high-level signal, so that the first signal pin and the second signal pin are connected, and the ground and the bus are disconnected.

Optionally, the detection control module includes a comparator and an inverter, where an inverting input end of the comparator is separately electrically connected to the first signal pin and a first end of the switch module, an output end of the comparator is respectively connected to an input end of the inverter and a second end of the switch module, an output end of the inverter is connected to a third end of the switch module, and a non-inverting input end of the comparator is connected to a reference voltage input end; in a case that the inverting input end of the comparator detects that the first signal pin outputs the high-level signal, the output end of the comparator outputs a low-level signal to the input end of the inverter, the first end of the switch module, and the second end of the switch module; and the switch module is configured to perform a preset operation according to the low-level signal input to the first end and the second end, and the high-level signal input to the third end, so that the first signal pin and the second signal pin are connected, and the ground and the bus are disconnected.

Optionally, the inverter has a delay function or the output end of the inverter is connected to a delayer, and the third end is configured to control the connection between the first signal pin and the second signal pin.

Optionally, the detection control module includes a voltage stabilizer and a controller, where the voltage stabilizer is connected in series between the bus and the controller, and the controller is separately connected to the first signal pin, a first end of the switch module, a second end of the switch module, and a third end of the switch module; the controller is configured to output a low-level signal to the first end of the switch module and the second end of the switch module, and output the high-level signal to the third end of the switch module in a case of detecting that the first signal pin outputs the high-level signal; and the switch module is configured to perform a preset operation according to the low-level signal input to the first end and the second end, and the high-level signal input to the third end, so that the first signal pin and the second signal pin are connected, and the ground and the bus are disconnected.

Optionally, the switch module includes a first switch unit, a second switch unit, a third switch unit, a pull-down resistor, and a pull-up resistor, where the pull-down resistor and the first switch unit are sequentially connected in series between the ground and a first end of the detection control module, the first signal pin is connected between the first switch unit and a second end of the detection control module, the second switch unit is connected in series between the first signal pin and the second signal pin, and the pull-up resistor and the third switch unit are sequentially connected in series between the bus and the second signal pin.

Optionally, the first switch unit, the second switch unit, and the third switch unit are all PMOS transistors or PNP triodes.

Optionally, the detection control module includes an optical coupler and an inverter, where an anode of the optical coupler is connected to the first signal pin, a source of the optical coupler is connected to the bus, a drain of the optical coupler is separately connected to an input end of the inverter and a first end of the switch module, and an output end of the inverter is connected to a second end of the switch module; the optical coupler is turned on in a case of detecting that the first signal pin outputs the high-level signal, and the optical coupler outputs the high-level signal to the input end of the inverter and the first end of the switch module; and the switch module is configured to perform a preset operation according to the high-level signal input to the first end and a low-level signal input to the second end, so that the first signal pin and the second signal pin are connected, and the ground and the bus are disconnected.

Optionally, the optical coupler includes a light emitting diode and a photosensitive triode arranged opposite to the light emitting diode, the switch module includes a first switch unit and a second switch unit, and the charging circuit further includes a first resistor, a second resistor, a third resistor, and a pull-up resistor, where the light emitting diode and the first resistor are sequentially connected in series between the first signal pin and the ground, the second resistor, the photosensitive triode, and the third resistor are sequentially connected in series between the bus and the ground, the inverter is connected in series between a drain of the photosensitive triode and the first switch unit, the first switch unit is connected in series between the first signal pin and the second signal pin, the pull-up resistor and the second switch unit are sequentially connected in series between the bus and the second signal pin, and the drain of the photosensitive triode is further connected to the second switch unit.

Optionally, the first switch unit and the second switch unit are NMOS transistors or NPN triodes.

According to a second aspect, an embodiment of this application further provides a charging cable, including the charging circuit described in the first aspect of the embodiments of this application.

In the embodiments of this application, the charging circuit includes a first interface, a second interface, a detection control module, and a switch module. The first interface outputs a high-level signal through a first signal pin in a case of detecting that the first interface is plugged with a charger compatible with a fast charging protocol; and the detection control module controls the switch module to perform a preset operation in a case of detecting the high-level signal, so that the first signal pin and a second signal pin are connected, and ground and a bus are disconnected, thereby disconnecting the circuit in ordinary charging, an electronic device can send a fast charging instruction to the first signal pin through the second signal pin, and the charger outputs a fast charging voltage according to the fast charging instruction to charge the electronic device.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application can be implemented in other sequences than the sequence illustrated or described herein. In addition, "and/or" in this specification and the claims represents at least one of the connected objects, and the character "/" generally indicates that the associated objects are in an "or" relationship.

The charging circuit and the charging cable provided in the embodiments of this application are described in detail below through specific embodiments and application scenarios thereof with reference to the accompanying drawings.

Figure 1:
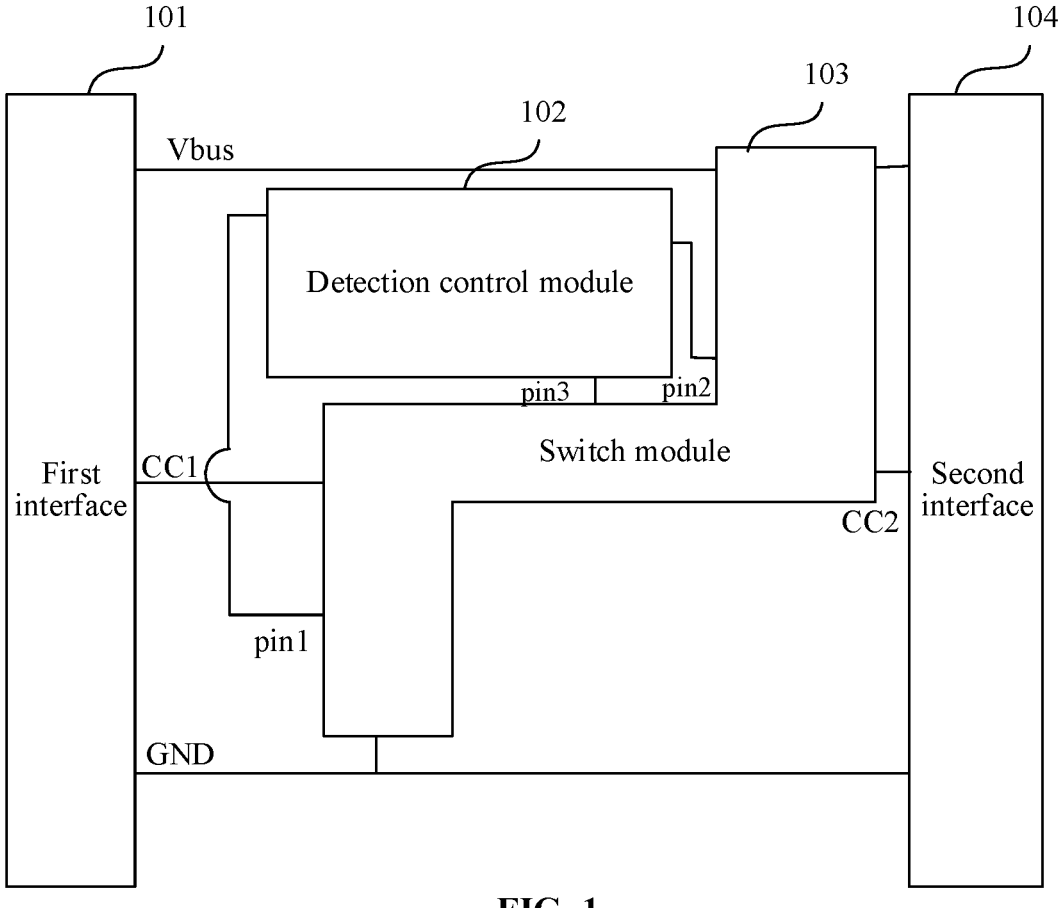
FIG. 1 is a circuit connection block diagram of a charging circuit according to an embodiment of this application.

Referring to FIG. 1, an embodiment of this application provides a charging circuit, including a first interface 101, a second interface 104, a detection control module 102, and a switch module 103, where the first interface 101 includes a first signal pin CC1, and the second interface 104 includes a second signal pin CC2. The detection control module 102 and the switch module 103 are sequentially connected in series between the first signal pin CC1 and the second signal pin CC2, and the switch module 103 is further connected in series between ground GND and a bus Vbus that is connected between the first interface 101 and the second interface 104. The first interface 101 is configured to plug a charger, and the second interface 104 is configured to plug a to-be-charged electronic device, where the electronic device may be, but is not limited to, a smartphone, a tablet computer, or the like that supports a fast charging protocol. In an initial state, the first signal pin CC1 and the second signal pin CC2 are disconnected, and the ground GND and the bus Vbus are connected. In a case that the first interface 101 is plugged with a charger incompatible with the fast charging protocol or the second interface 104 is plugged with an electronic device incompatible with the fast charging protocol, the charger outputs a voltage through the bus Vbus to perform ordinary charging for the electronic device connected to the second interface 104.

Specifically, the first interface 101 is configured to output a high-level signal through the first signal pin CC1 in a case of detecting that the first interface is plugged with a charger compatible with a fast charging protocol.

The detection control module 102 is configured to control the switch module 103 to perform a preset operation in a case of detecting the high-level signal, so that the first signal pin CC1 and the second signal pin CC2 are connected, and the ground GND and the bus Vbus are disconnected.

Specifically, when in use, the charging circuit may be applied to the following scenarios to perform charging.

First scenario: both the charger and the electronic device support the fast charging protocol. In the initial state, the first signal pin CC1 and the second signal pin CC2 are disconnected, and the ground GND and the bus Vbus are connected. When the charger is plugged into the first interface 101, since the charger supports the fast charging protocol, the charger may be docked with the first signal pin CC1, and the first signal pin CC1 outputs a high-level signal, thereby controlling the switch module 103 to perform the preset operation, so that the first signal pin CC1 and the second signal pin CC2 are connected, and the ground GND and the bus Vbus are disconnected. Subsequently, the electronic device is plugged into the second interface 104, since the electronic device also supports the fast charging protocol, the electronic device may be docked with the second signal pin CC2, and since the first signal pin CC1 and the second signal pin CC2 are connected, the electronic device communicates with the charger and is charged at a fast charging voltage.

Second scenario: both the charger and the electronic device support the fast charging protocol. When the second interface is plugged into the electronic device first, since the bus Vbus is not powered on, the electronic device performs no action, and the charger is subsequently plugged into the first interface. In a case that the electronic device responds quickly, since the first signal pin CC1 and the second signal pin CC2 are disconnected, and the ground GND and the bus Vbus are connected, the electronic device can obtain a charging voltage from the bus Vbus to perform ordinary charging. Subsequently, the first signal pin CC1 outputs a high-level signal, thereby controlling the switch module 103 to perform the preset operation, so that the first signal pin CC1 and the second signal pin CC2 are connected, and the ground GND and the bus Vbus are disconnected, and the electronic device communicates with the charger, and is charged at the fast charging voltage. In a case that the electronic device responds slowly, the first signal pin CC1 outputs a high-level signal, thereby controlling the switch module 103 to perform the preset operation, so that the first signal pin CC1 and the second signal pin CC2 are connected, the ground GND and the bus Vbus are disconnected, and the electronic device communicates with the charger, and is charged at the fast charging voltage.

Third scenario: the charger does not support the fast charging protocol (or supports the fast charging protocol but cannot be docked with the first signal pin CC1), and the electronic device also does not support the fast charging protocol. In the initial state, the first signal pin CC1 and the second signal pin CC2 are disconnected, and the ground GND and the bus Vbus are connected. When the charger is plugged, since the charger does not support the fast charging protocol, the charger cannot be docked with the second signal pin CC2, so that the first signal pin CC1 and the second signal pin CC2 remain disconnected, and the ground GND and the bus Vbus remain connected. After the electronic device is plugged, the electronic device can obtain a charging voltage from the bus Vbus to perform ordinary charging.

Fourth scenario: the charger supports the fast charging protocol, and the electronic device does not support the fast charging protocol. In the initial state, the first signal pin CC1 and the second signal pin CC2 are disconnected, and the ground GND and the bus Vbus are connected. When the charger is plugged, since the charger supports the fast charging protocol, the charger can be docked with the second signal pin CC2, so that the first signal pin CC1 outputs a high-level signal, thereby controlling the switch module 103 to perform the preset operation, so that the first signal pin CC1 and the second signal pin CC2 are connected, and the ground GND and the bus Vbus are disconnected. Since the electronic device cannot be docked with the second signal pin CC2, the electronic device cannot communicate with the charger. Therefore, the charger can only perform ordinary charging for the electronic device through the first signal pin CC1 and the second signal pin CC2.

Fifth scenario: the charger does not support the fast charging protocol, and the electronic device supports the fast charging protocol. In the initial state, the first signal pin CC1 and the second signal pin CC2 are disconnected, and the ground GND and the bus Vbus are connected. When the charger is plugged, since the charger does not support the fast charging protocol, the charger cannot be docked with the second signal pin CC2, so that the first signal pin CC1 and the second signal pin CC2 remain disconnected, and the ground GND and the bus Vbus remain connected. Although the electronic device can be docked with the second signal pin CC2, since the first signal pin CC1 and the second signal pin CC2 remain disconnected, the electronic device cannot communicate with the charger. Therefore, the electronic device can only obtain a charging voltage from the bus Vbus to perform ordinary charging.

In conclusion, the charging circuit includes a first interface 101, a second interface 104, a detection control module 102, and a switch module 103. The first interface 101 outputs a high-level signal through a first signal pin CC1 in a case of detecting that the first interface is plugged with a charger compatible with a fast charging protocol. The detection control module 102 controls the switch module 103 to perform a preset operation in a case of detecting the high-level signal, so that the first signal pin CC1 and a second signal pin CC2 are connected, and ground GND and a bus Vbus are disconnected, which causes the circuit in ordinary charging to be disconnected. An electronic device can send a fast charging instruction to the first signal pin CC1 through the second signal pin CC2, and the charger outputs a fast charging voltage according to the fast charging instruction to charge the electronic device that supports the fast charging protocol, thereby realizing fast charging in a case of being compatible with ordinary charging.

Figure 2:
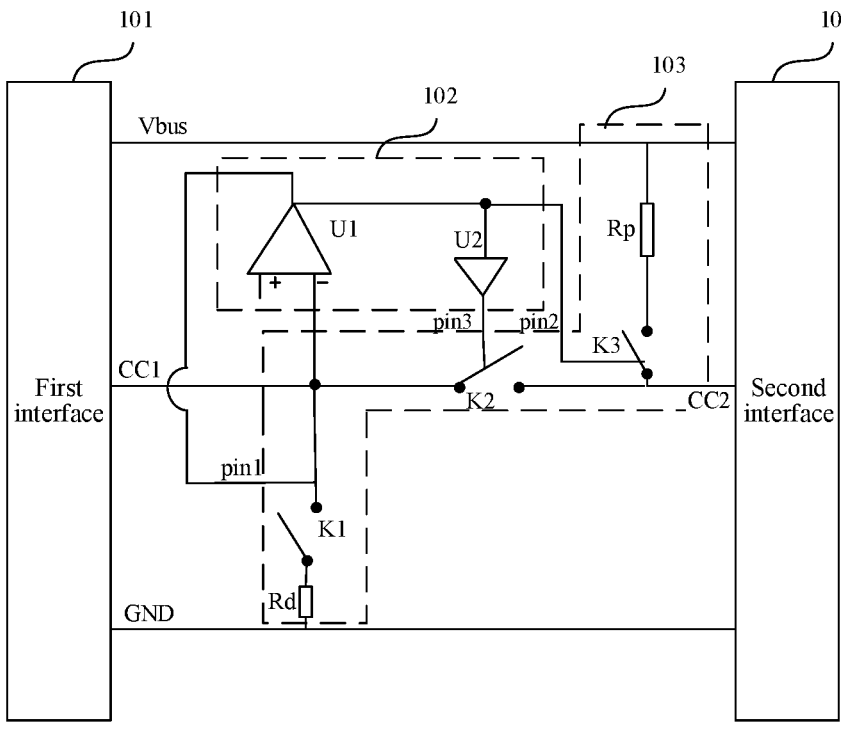
FIG. 2 is a specific circuit diagram of a charging circuit according to an embodiment of this application.

Specifically, as shown in FIG. 2, design manners of the detection control module 102 specifically include, but are not limited to, the following three manners.

First manner: the detection control module 102 includes a comparator U1 and an inverter U2, where an inverting input end of the comparator U1 is separately electrically connected to the first signal pin CC1 and a first end pin1 of the switch module 103, an output end of the comparator U1 is separately connected to an input end of the inverter U2 and a second end pin2 of the switch module 103, an output end of the inverter U2 is connected to a third end pin3 of the switch module 103, and a non-inverting input end of the comparator U1 is connected to a reference voltage input end.

In a case that the inverting input end of the comparator U1 detects that the first signal pin CC1 outputs the high-level signal, the output end of the comparator U1 outputs a low-level signal to the input end of the inverter U2 (the inverter U2 inverts the low-level signal into a high-level signal), the first end pin1 of the switch module 103, and the second end pin2 of the switch module 103.

According to the specification of the fast charging protocol, a lowest level output by the first signal pin CC1 is 0.408 v, and a positive reference voltage Vref of the comparator U1 is preset to 0.35 v. Therefore, a voltage at the inverting input end is greater than a voltage at a non-inverting input end, and the comparator U1 outputs a low-level signal.

The switch module 103 is configured to perform a preset operation according to the low-level signal input to the first end pin1 and the second end pin2, and a high-level signal input to the third end pin3, so that the first signal pin CC1 and the second signal pin CC2 are connected, and the ground GND and the bus Vbus are disconnected.

The inverter U2 has a delay function or the output end of the inverter U2 is connected to a delayer, and the third end pin3 is configured to control the connection between the first signal pin CC1 and the second signal pin CC2. Such an arrangement may cause the connection between the first signal pin CC1 and the second signal pin CC2 to lag behind the disconnection between the ground GND and the bus Vbus, thereby avoiding damaging the electronic device due to charging the electronic device at the same time by the bus Vbus voltage and the fast charging voltage.

Figure 3:
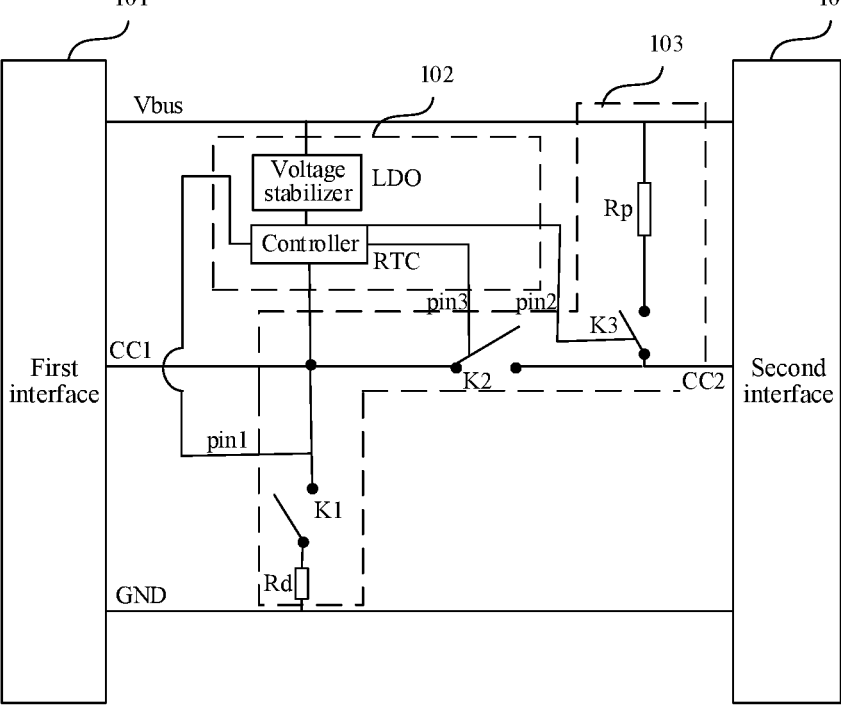
FIG. 3 is a specific circuit diagram of a charging circuit according to an embodiment of this application.

Second manner: as shown in FIG. 3, the detection control module 102 includes a voltage stabilizer LDO and a controller RTC, where the voltage stabilizer LDO is connected in series between a bus Vbus and the controller RTC, and the controller RTC is separately connected to a first signal pin CC1, a first end pin1 of a switch module 103, a second end pin2 of the switch module 103, and a third end pin3 of the switch module 103. The voltage stabilizer LDO is config-ured to convert a bus Vbus voltage output by the first interface 101 into an operating voltage of the controller RTC.

The controller RTC is configured to output a low-level signal to the first end pin1 of the switch module 103 and the second end pin2 of the switch module 103, and output the high-level signal to the third end pin3 of the switch module 103 in a case of detecting that the first signal pin CC1 outputs the high-level signal.

The switch module 103 is configured to perform a preset operation according to the low-level signal input to the first end pin1 and the second end pin2, and a high-level signal input to the third end pin3, so that the first signal pin CC1 and the second signal pin CC2 are connected, and the ground GND and the bus Vbus are disconnected.

In addition, the controller RTC may control the high-level signal output to the third end pin3 of the switch module 103 to lag behind the low-level signal output to the first end pin1 of the switch module 103 and the second end pin2 of the switch module 103. Such an arrangement may cause the connection between the first signal pin CC1 and the second signal pin CC2 to lag behind the disconnection between the ground GND and the bus Vbus, thereby avoiding damaging the electronic device due to charging the electronic device at the same time by the bus Vbus voltage and the fast charging voltage.

Specifically, based on the above, as shown in FIG. 2 and FIG. 3, the switch module 103 may include a first switch unit K1, a second switch unit K2, a third switch unit K3, a pull-down resistor Rd, and a pull-up resistor RP. The pull-down resistor Rd and the first switch unit K1 are sequentially connected in series between the ground GND and a first end of the detection control module 102, the first signal pin CC1 is connected between the first switch unit K1 and a second end of the detection control module 102, the second switch unit K2 is connected in series between the first signal pin CC1 and the second signal pin CC2, and the pull-up resistor RP and the third switch unit K3 are sequentially connected in series between the bus Vbus and the second signal pin CC2.

It may be understood that the first switch unit K1 is connected to the first end pin1, the second switch unit K2 is connected to the second end pin2, and the third switch unit K3 is connected to the third end pin3; and the first switch unit K1, the second switch unit K2, and the third switch unit K3 are connected in a case of receiving the high-level signal, and disconnected in a case of receiving the low-level signal. In addition, according to the specification of the fast charg-ing protocol, a resistance value of the pull-down resistor Rd may be 5.1 k$\Omega$ but is not limited to that of the pull-down resistor and a resistance value of the pull-up resistor RP may be 56 k$\Omega$ but is not limited to that of the pull-up resistor RP.

Optionally, in this embodiment, each of the first switch unit K1, the second switch unit K2, and the third switch unit K3 may be a PMOS transistor or a PNP triode, which is not limited herein.

Figure 4:
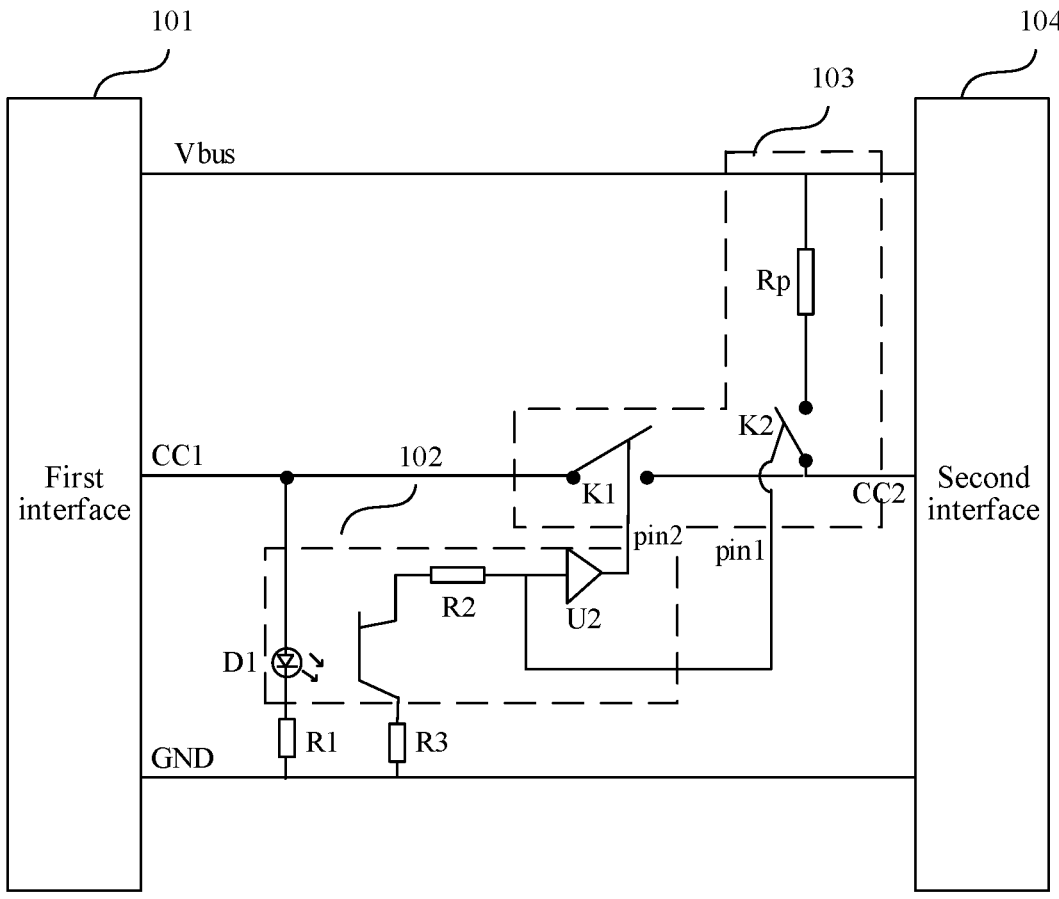
FIG. 4 is a specific circuit diagram of a charging circuit according to an embodiment of this application.

Third manner: as shown in FIG. 4, the detection control module 102 includes an optical coupler and an inverter U2, where an anode of the optical coupler is connected to the first signal pin CC1, a source of the optical coupler is connected to the bus Vbus, a drain of the optical coupler is separately connected to an input end of the inverter U2 and a first end pin1 of the switch module 103, and an output end of the inverter U2 is connected to a second end pin2 of the switch module 103.

The optical coupler is turned on in a case of detecting that the first signal pin CC1 outputs the high-level signal, and the optical coupler outputs the high-level signal to the input end of the inverter U2 and the first end pin1 of the switch module 103.

The switch module 103 is configured to perform a preset operation according to the high-level signal input to the first end pin1 and a low-level signal input to the second end pin2, so that the first signal pin CC1 and a second signal pin CC2 are connected, and the ground GND and the bus Vbus are disconnected.

Specifically, as shown in FIG. 4, the optical coupler includes a light emitting diode D1 and a photosensitive triode arranged opposite to the light emitting diode D1, the switch module 103 includes a first switch unit K1 and a second switch unit K2, and the charging circuit further includes: a first resistor R1, a second resistor R2, a third resistor R3, and a pull-up resistor RP, where the light emitting diode D1 and the first resistor R1 are sequentially connected in series between the first signal pin CC1 and the ground GND, and the second resistor R2, the photosensitive triode, and the third resistor R3 are sequentially connected in series between the bus Vbus and the ground GND, the inverter U2 is connected in series between a drain of the photosensitive triode and the first switch unit K1, the first switch unit K1 is connected in series between the first signal pin CC1 and the second signal pin CC2, the pull-up resistor RP and the second switch unit K2 are sequentially connected in series between the bus Vbus and the second signal pin CC2, and the drain of the photosensitive triode is further connected to the second switch unit K2.

It may be understood that the first switch unit K1 is connected to the second end pin2, and the second switch unit K2 is connected to the first end pin1; and the first switch unit K1 and the second switch unit K2 are connected in a case of receiving the low-level signal is received, and disconnected in a case of receiving the high-level signal.

Optionally, in this embodiment, the first switch unit K1 and the second switch unit K2 may be, but are not limited to, NMOS transistors or NPN triodes.

In addition, an embodiment of this application further provides a charging cable, including the charging circuit described in the foregoing embodiments.

It needs to be noted that, terms "include", "comprise", or any other variation thereof in this specification are intended to cover a non-exclusive inclusion, so that a process, a method, an article, or an apparatus including a series of elements includes not only those elements, but also other elements that are not expressly listed, or elements inherent to this process, method, article, or apparatus. Without more limitations, elements defined by the sentence "including one . . . " does not exclude that there are still other same elements in the processes, methods, objects, or apparatuses. In addi-tion, it needs to be noted that the scope of the method and apparatus in the embodiments of this application is not limited to performing functions in the order shown or discussed, but may also include performing functions in a basically simultaneous manner or in a reverse order accord-ing to the functions involved. For example, the described method may be performed in an order different from the described order, and various steps may also be added, omitted, or combined. In addition, features described with reference to some examples may be combined in other examples.

Through the descriptions of the foregoing implementa-tions, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings, but this application is not limited to the specific embodiments described above, and the specific embodiments described above are merely exemplary rather than limited. Under the inspiration of this application, a person of ordinary skill in the art can make many forms without departing from the scope of this application and the protection of the claims, all of which fall within the protection of this application.

What is claimed is:

1. A charging circuit, comprising a first interface, a second interface, a detection control module, and a switch module, wherein the first interface comprises a first signal pin, the second interface comprises a second signal pin, the detection control module and the switch module are sequentially connected in series between the first signal pin and the second signal pin, and the switch module is further connected in series between ground and a bus that is connected between the first interface and the second interface;

the first interface is configured to output a high-level signal through the first signal pin in a case of detecting that the first interface is plugged with a charger compatible with a fast charging protocol; and the detection control module is configured to control the switch module to perform a preset operation in a case of detecting the high-level signal, so that the first signal pin and the second signal pin are connected, and the ground and the bus are disconnected;

wherein the detection control module comprises a comparator and an inverter, wherein an inverting input end of the comparator is separately electrically connected to the first signal pin and a first end of the switch module, an output end of the comparator is separately connected to an input end of the inverter and a second end of the switch module, an output end of the inverter is connected to a third end of the switch module, and a non-inverting input end of the comparator is connected to a reference voltage input end;

in a case that the inverting input end of the comparator detects that the first signal pin outputs the high-level signal, the output end of the comparator outputs a low-level signal to the input end of the inverter, the first end of the switch module, and the second end of the switch module; and the switch module is configured to perform a preset operation according to the low-level signal input to the first end and the second end, and the high-level signal input to the third end, so that the first signal pin and the second signal pin are connected, and the ground and the bus are disconnected.

2. The charging circuit according to claim 1, wherein the inverter has a delay function or the output end of the inverter is connected to a delayer, and the third end is configured to control the connection between the first signal pin and the second signal pin.

3. The charging circuit according to claim 1, wherein the detection control module comprises a voltage stabilizer and a controller, wherein the voltage stabilizer is connected in series between the bus and the controller, and the controller is separately connected to the first signal pin, a first end of the switch module, a second end of the switch module, and a third end of the switch module;

the controller is configured to output a low-level signal to the first end of the switch module and the second end of the switch module, and output the high-level signal to the third end of the switch module in a case of detecting that the first signal pin outputs the high-level signal; and the switch module is configured to perform a preset operation according to the low-level signal input to the first end and the second end, and the high-level signal input to the third end, so that the first signal pin and the second signal pin are connected, and the ground and the bus are disconnected.

4. The charging circuit according to claim 1, wherein the switch module comprises a first switch unit, a second switch unit, a third switch unit, a pull-down resistor, and a pull-up resistor, wherein the pull-down resistor and the first switch unit are sequentially connected in series between the ground and a first end of the detection control module, the first signal pin is connected between the first switch unit and a second end of the detection control module, the second switch unit is connected in series between the first signal pin and the second signal pin, and the pull-up resistor and the third switch unit are sequentially connected in series between the bus and the second signal pin.

5. The charging circuit according to claim 4, wherein the first switch unit, the second switch unit, and the third switch unit are all PMOS transistors or PNP triodes.

6. The charging circuit according to claim 1, wherein the detection control module comprises an optical coupler and an inverter, wherein an anode of the optical coupler is connected to the first signal pin, a source of the optical coupler is connected to the bus, a drain of the optical coupler is separately connected to an input end of the inverter and a first end of the switch module, and an output end of the inverter is connected to a second end of the switch module;

the optical coupler is turned on in a case of detecting that the first signal pin outputs the high-level signal, and the optical coupler outputs the high-level signal to the input end of the inverter and the first end of the switch module; and the switch module is configured to perform a preset operation according to the high-level signal input to the first end and a low-level signal input to the second end, so that the first signal pin and the second signal pin are connected, and the ground and the bus are disconnected.

7. The charging circuit according to claim 6, wherein the optical coupler comprises a light emitting diode and a photosensitive triode arranged opposite to the light emitting diode, the switch module comprises a first switch unit and a second switch unit, and the charging circuit further comprises: a first resistor, a second resistor, a third resistor, and a pull-up resistor, wherein the light emitting diode and the first resistor are sequentially connected in series between the first signal pin and the ground, the second resistor, the photosensitive triode, and the third resistor are sequentially connected in series between the bus and the ground, the inverter is connected in series between a drain of the photosensitive triode and the first switch unit, the first switch unit is connected in series between the first signal pin and the second signal pin, the pull-up resistor and the second switch unit are sequentially connected in series between the bus and the second signal pin, and the drain of the photosensitive triode is further connected to the second switch unit.

8. The charging circuit according to claim 6, wherein the first switch unit and the second switch unit are NMOS transistors or NPN triodes.

9. The charging circuit according to claim 1, wherein the switch module comprises a first switch unit, a second switch unit, a third switch unit, a pull-down resistor, and a pull-up resistor, wherein the pull-down resistor and the first switch unit are sequentially connected in series between the ground and a first end of the detection control module, the first signal pin is connected between the first switch unit and a second end of the detection control module, the second switch unit is connected in series between the first signal pin and the second signal pin, and the pull-up resistor and the third switch unit are sequentially connected in series between the bus and the second signal pin.

10. A charging cable, comprising a charging circuit, wherein charging circuit comprises a first interface, a second interface, a detection control module, and a switch module, wherein the first interface comprises a first signal pin, the second interface comprises a second signal pin, the detection control module and the switch module are sequentially connected in series between the first signal pin and the second signal pin, and the switch module is further connected in series between ground and a bus that is connected between the first interface and the second interface;

the first interface is configured to output a high-level signal through the first signal pin in a case of detecting that the first interface is plugged with a charger compatible with a fast charging protocol; and the detection control module is configured to control the switch module to perform a preset operation in a case of detecting the high-level signal, so that the first signal pin and the second signal pin are connected, and the ground and the bus are disconnected;

wherein the detection control module comprises a comparator and an inverter, wherein an inverting input end of the comparator is separately electrically connected to the first signal pin and a first end of the switch module, an output end of the comparator is separately connected to an input end of the inverter and a second end of the switch module, an output end of the inverter is connected to a third end of the switch module, and a non-inverting input end of the comparator is connected to a reference voltage input end;

in a case that the inverting input end of the comparator detects that the first signal pin outputs the high-level signal, the output end of the comparator outputs a low-level signal to the input end of the inverter, the first end of the switch module, and the second end of the switch module; and the switch module is configured to perform a preset operation according to the low-level signal input to the first end and the second end, and the high-level signal input to the third end, so that the first signal pin and the second signal pin are connected, and the ground and the bus are disconnected.

11. The charging cable according to claim 10, wherein inverter has a delay function or the output end of the inverter is connected to a delayer, and the third end is configured to control the connection between the first signal pin and the second signal pin.

12. The charging cable according to claim 10, wherein the detection control module comprises a voltage stabilizer and a controller, wherein the voltage stabilizer is connected in series between the bus and the controller, and the controller is separately connected to the first signal pin, a first end of the switch module, a second end of the switch module, and a third end of the switch module;

the controller is configured to output a low-level signal to the first end of the switch module and the second end of the switch module, and output the high-level signal to the third end of the switch module in a case of detecting that the first signal pin outputs the high-level signal; and the switch module is configured to perform a preset operation according to the low-level signal input to the first end and the second end, and the high-level signal input to the third end, so that the first signal pin and the second signal pin are connected, and the ground and the bus are disconnected.

13. The charging cable according to claim 10, wherein the switch module comprises a first switch unit, a second switch unit, a third switch unit, a pull-down resistor, and a pull-up resistor, wherein the pull-down resistor and the first switch unit are sequentially connected in series between the ground and a first end of the detection control module, the first signal pin is connected between the first switch unit and a second end of the detection control module, the second switch unit is connected in series between the first signal pin and the second signal pin, and the pull-up resistor and the third switch unit are sequentially connected in series between the bus and the second signal pin.

14. The charging cable according to claim 13, wherein the first switch unit, the second switch unit, and the third switch unit are all PMOS transistors or PNP triodes.

15. The charging cable according to claim 10, wherein the detection control module comprises an optical coupler and an inverter, wherein an anode of the optical coupler is connected to the first signal pin, a source of the optical coupler is connected to the bus, a drain of the optical coupler is separately connected to an input end of the inverter and a first end of the switch module, and an output end of the inverter is connected to a second end of the switch module;

the optical coupler is turned on in a case of detecting that the first signal pin outputs the high-level signal, and the optical coupler outputs the high-level signal to the input end of the inverter and the first end of the switch module; and the switch module is configured to perform a preset operation according to the high-level signal input to the first end and a low-level signal input to the second end, so that the first signal pin and the second signal pin are connected, and the ground and the bus are disconnected.

16. The charging cable according to claim 15, wherein the optical coupler comprises a light emitting diode and a photosensitive triode arranged opposite to the light emitting diode, the switch module comprises a first switch unit and a second switch unit, and the charging circuit further comprises: a first resistor, a second resistor, a third resistor, and a pull-up resistor, wherein the light emitting diode and the first resistor are sequentially connected in series between the first signal pin and the ground, the second resistor, the photosensitive triode, and the third resistor are sequentially connected in series between the bus and the ground, the inverter is connected in series between a drain of the photosensitive triode and the first switch unit, the first switch unit is connected in series between the first signal pin and the second signal pin, the pull-up resistor and the second switch unit are sequentially connected in series between the bus and the second signal pin, and the drain of the photosensitive triode is further connected to the second switch unit.

17. The charging cable according to claim 15, wherein the first switch unit and the second switch unit are NMOS transistors or NPN triodes.

18. The charging cable according to claim 10, wherein the switch module comprises a first switch unit, a second switch unit, a third switch unit, a pull-down resistor, and a pull-up resistor, wherein the pull-down resistor and the first switch unit are sequentially connected in series between the ground and a first end of the detection control module, the first signal pin is connected between the first switch unit and a second end of the detection control module, the second switch unit is connected in series between the first signal pin and the second signal pin, and the pull-up resistor and the third switch unit are sequentially connected in series between the bus and the second signal pin.

* * * * *